Feb. 8, 1944.  F. T. ROBIDOUX  2,340,987
ELECTRICAL WELL CALIPER
Filed Nov. 14, 1941
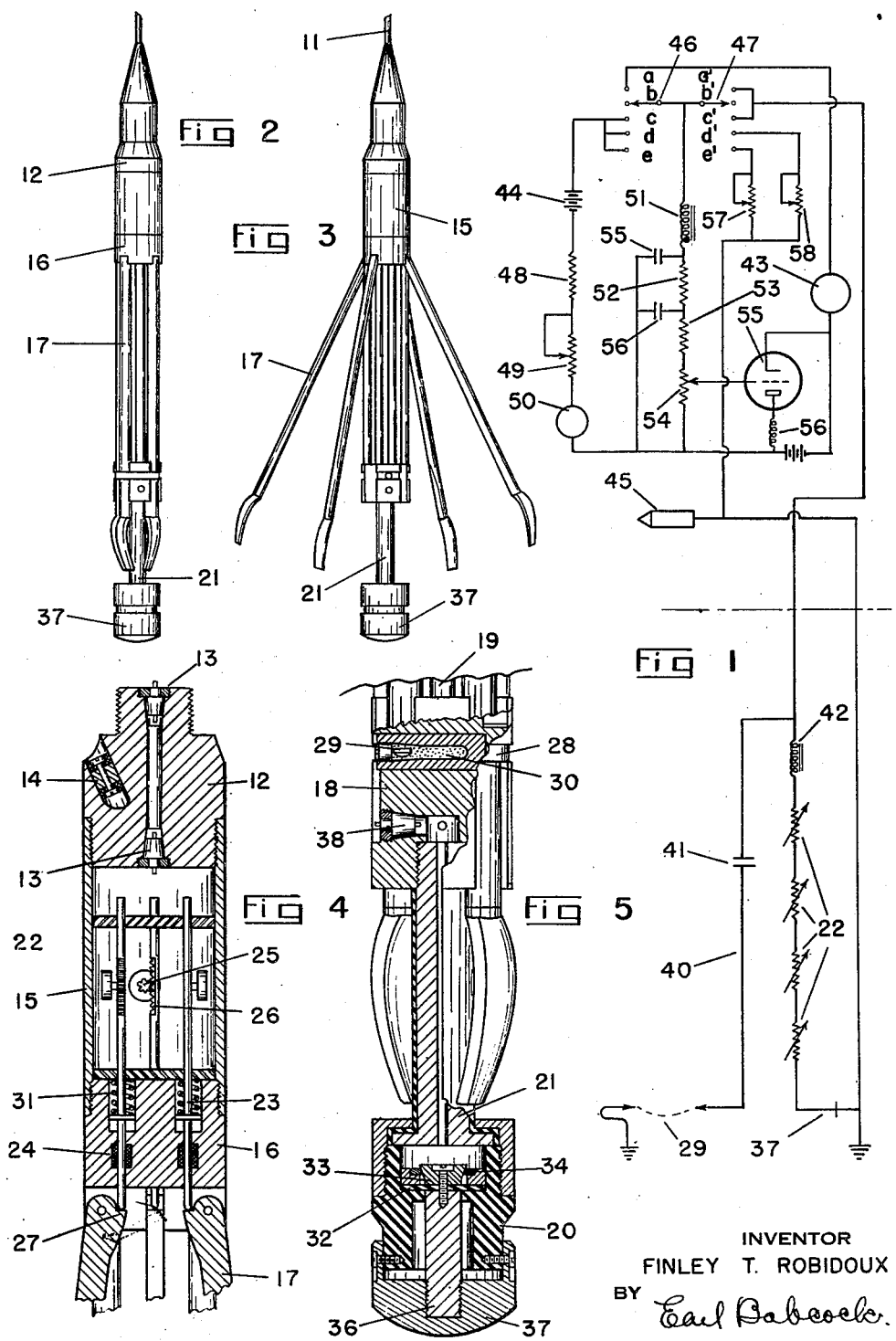
INVENTOR
FINLEY T. ROBIDOUX
BY Earl Babcock Patented Feb. 8, 1944

2,340,987

UNITED STATES PATENT OFFICE 2,340,987

ELECTRICAL WELL CALIPER

Finley T. Robidoux, Houston, Tex., assignor to Halliburton Oil Well Cementing Company, Duncan, Okla.

Application November 14, 1941, Serial No. 419,215

3 Claims. (Cl. 33—178)

This invention relates to electrical calipers for oil wells, and more particularly to electrical system and apparatus for determining and recording variations in the diameter of a well bore.

Suitable calipers for oil wells are disclosed in the patents to Myron M. Kinley, No. 2,102,080, granted December 14, 1937, for "Well surveying device," and No. 2,267,110, granted December 23, 1941, for "Surveying calipers."

In the disclosure of the latter patents a caliper tool is lowered into the well and the movement of the arms of the caliper in response to variations in diameter of the well bore cause corresponding variations in the electrical resistance of a circuit, so that these variations may be measured and recorded at the surface, and obtain a "caliper log" of the well.

The present invention is particularly directed to an electrical circuit suitable for use with a "Kinley" type electrical caliper and to the provision of improved mechanism for operating a caliper in an oil well to obtain a log of variations in the diameter of a well.

Accordingly, it is an object of the present invention to provide an electrical system having novel control, measuring and calibrating means which cooperate to provide a simple and compact arrangement for making automatically a log or record of variations in the diameter of a well bore.

It is a further object to provide an improved caliper assembly to be lowered into a well to obtain a caliper log or a caliper log plus one or more electric logs.

Other objects and advantages reside in certain novel features of the arrangement, as will be apparent from the following description taken in connection with the accompanying drawing, in which:

Figure 1 is a diagram of an electrical circuit incorporating the features of the present invention;

Figure 2 is a side view of a caliper tool constructed in accordance with the present invention, the view showing the tool with the parts in the position they occupy as the tool is being lowered into an oil well;

Figure 3 is a side view of the apparatus of Figure 2, but showing the parts in the position they occupy while making a caliper log;

Figure 4 is a side view in partial cross-section of a detail of the apparatus shown in Figures 2 and 3; and Figure 5 is a side view in partial cross-section showing the details of the lower portion of the apparatus of Figures 2 and 3.

Referring to the drawing in detail, and first to the structure disclosed in Figures 2, 3, 4 and 5, it will be seen that the apparatus there disclosed is similar in many respects to that of the Kinley patents cited above, except that provision is made for electrically releasing the caliper arms in response to an electrical impulse sent down to the caliper tool through an electrical cable.

As shown in Figures 2 and 3, the caliper tool is adapted to be lowered into the well upon a single conductor cable 11, which may be of a known type commonly used in the oil fields for electric logging and which has a steel sheath. Since the apparatus is normally lowered into a well filled with mud, the steel sheath forms a good means for making a ground.

The upper end of the caliper tool is mechanically provided with a coupling member 12 which is connected to the sheath of the cable and which contains suitable means 13 for making electrical connection with the conductor thereof. The connector 13 preferably consists of a pin, to which the conductor can be soldered, extending through an insulating bushing secured in the top of coupling 12.

The caliper tool proper is supported upon the coupling 12. It consists mainly of a housing 15, a lower coupling member 16, to which suitable arms 17 are pivoted, an arm latching mechanism 18 connected to the lower coupling 16 by four spacing rods or struts 19, and tip switch mechanism in plug 20 secured to the bottom of the latch mechanism 18 by a member 21.

The housing 15 contains suitable rheostats 22 all electrically connected in series. One rheostat for each arm 17 of the caliper is provided. In the arrangement illustrated, there are four arms 17 and, hence, four rheostats. Obviously, the number of arms and rheostats can be varied.

The chamber in housing 15 is normally completely filled with oil or other liquid and the coupling 16 is provided with suitable plunger rods 23, which extend through packing glands 24 therein, and operate pinions 25 connected to the rheostats, through racks 26.

To enable the plungers 23 to enter the chamber, and also to permit operation of the tip switch, as explained hereinafter, a movable plunger 14 is mounted in a hole in the coupling 12, the hole being connected to the chamber in the housing 15. Thus the fluid pressure inside the housing is always the same as that on the outside.

As best shown in Figure 4, the lower end of each plunger 23 abuts against a bell crank portion 27 of one of the caliper arms 17.

One of the struts 19 which connect the coupling 16 with the latch mechanism 18 may be hollow so that an electrical conductor may extend downwardly therethrough to operate the latch mechanism and to make connection to the tip switch 20 connected as shown in Figure 1 and described hereinafter.

When the device is lowered into the hole, all the caliper arms 17 are held in latched or inoperative position, being all bound together and nested between the struts 19, by a steel band 28, the parts then being in the position shown in Figures 2 and 5. Within the latch mechanism 18, there is an electrical squib 29 capable of being electrically fired to ignite powder 30 and burst the band 28, thus releasing the caliper arms 17 and permitting them to move outwardly to contact the wall of the bore hole, as shown in Figure 3. Springs 31 located in coupling member 16 urge the caliper arms outwardly.

Means other than that illustrated, such as an electromagnetically operable latch may be employed, if desired.

In any case, it is necessary that the arms be electrically controlled and not released until the tool has been lowered to the bottom of the well or to the lowest point at which the log is to be made.

The tip switch in the plug 20 is used to determine when the arrangement strikes bottom or hits a bridge in the well. The plug 20 is hollow and is provided with a flexible diaphragm 32 upon which a contact button 33 is mounted, this button normally making contact with ring 34. Beneath the diaphragm 32 there is a bolt 35 provided with a rounded tip 36. The bolt 36, tip 37 and contact button 33 are moved upwardly within the plug 20 when the assembly is lowered against the bottom of the hole, so as to break the contact between the elements 33 and 34.

The tip 37 constitutes an electrical ground and when the contact button 33 engages the ring 34, one side of one of the rheostats 22 is grounded thereby, the ring 34 being connected to an electrical conductor extending up through the hollow supporting member 21 and on up through one of the struts 19.

The conduit for this conductor is filled with oil and is in fluid communication with the oil filled chamber within the housing 15 at the upper part of the tool. In this way the diaphragm 32 is permitted to flex upwardly in the same way that the plungers 23 are permitted to move upwardly within the housing 15, the plunger 14 taking care of variations in volume in the closed fluid system.

There is also a connection to the squib 29 through a conductor extending down through one strut 19, the circuit coming to the outside of the tool and entering the firing chamber through fluid tight connectors 38 like the connector 13 at the top of the unit.

If only a caliper log of the diameter of the hole is being made, it is preferable that the plug 20 and the supporting coupling member 21 be metallic. In this way, the tip 37, in addition to making an electrical ground through the mud in the well is also electrically connected directly to the sheath of the cable 11 through the metallic parts of the caliper tool. Variations in natural potential in the earth, variations in resistance of the mud in the hole and variations in the resistance of formations of the earth will then not be reflected on the log.

If, however, it is desired to use the apparatus shown to make a caliper log of variations in diameter of the hole while making a natural potential log or a resistance or impedance log simultaneously or with but a single run of the tool in a well, the tip 37, the bolt 36 and the contact button 33 must be insulated from the cable sheath and this is the arrangement illustrated. In this case, the plug 20 may be made of "Bakelite," or other insulating material, and it is preferable also to insulate the coupling member 21 from the mud as illustrated; for instance, by covering it with rubber or tape. It is then possible, without altering the assembly shown, to obtain electric logs of variations in natural potential at the tip 36 and also variations in resistance or impedance between the tip 37 and the ground, as the device is being lowered into the well with the arms 17 in the position shown in Figure 2. It should be stated that in this position the rheostats 22 may be largely or entirely out of the circuit.

As normally constructed, the rheostats 22 are at "zero" position when the arms are collapsed, as shown in Figure 2, and as they move out, the resistance is increased. Thus, before the arms are released, the rheostats are not in the circuit. The device may then be used like any other single electrode commonly used for electrically logging wells in the manner described, for example, in the patent to Rust et al., No. 2,132,807, granted October 11, 1938, for "Single cable electrical well logging."

If an impedance log is desired, 500 cycle current may be used, if its voltage is kept low (say, 3 volts) even if 500 cycle current of a higher voltage is used to fire the squib as described hereinafter.

Moreover, if desired, it is possible to simultaneously obtain an electric log and a caliper log with the apparatus if the tip 37 is insulated from the main body of the tool. For example, even though the rheostats 22 are being manipulated to vary the resistance of the circuit, a potentometer connected to the conductor of the cable at the surface will record variations in natural potential occurring at the tip 37, at the same time that the system shown in Figure 1 is being used to make a caliper log, if an alternating current source, say 60 cycles, is substituted for the battery 44 and a suitable filter is provided. It is sometimes slightly advantageous to make two logs simultaneously, mainly because it is then easier to correlate the two as to depth.

Insofar as the caliper log per se is concerned, there is a slight disadvantage in having the tip 37 insulated from the cable sheath. The effect of natural potentials at the tip and the effect of variations in resistance between it and the ground will be reflected in the caliper log. However, the error in measurement of the well diameter due to these effects will not be great if the resistors 22 have sufficiently large values, say, 1,000 ohms each.

The electrical circuits which may be employed in connection with the electrode assembly for making regular electrical logs is not disclosed herein, being well-known electrical equipment.

An electrical circuit suitable for making a caliper log is shown in Figure 1. In this figure the portion beneath the dash-dot line represents the electrical equipment in the well, while that above it, represents the surface equipment.

As shown in Figure 1, the four rheostats 22 referred to above are connected in series with the tip switch 37 which is grounded. There is also a connection through a conductor 40 to the squib 29 which is likewise grounded. The circuit to the squib 29 contains a condenser 41 and if desired, a choke coil 42 may be placed in series with the rheostats 22 to prevent the alternating current which fires the squib from burning out the resistors 22. (If an impedance log is to be obtained on the "down" trip, through this connection, the choke coil should not be used.)

The surface equipment includes two sources; one alternating current, say 200 volts, 500 cycles, represented at 43, and the other direct current, such as the battery 44.

The 500 cycle source 43 is used to fire the squib and its circuit is very simple. One side of this source is grounded. The ground may be to an electrode 45 or to the cable sheath, or both. The other side of the source 43 is lead to the upper contact of a switch 46, the blade of which is connected to the blade of a switch 47.

The switches 46 and 47 are multiple contact switches, each having five fixed contacts, and the blades are ganged on the same shaft, so that they cannot work independently of each other. An ordinary double pole switch with five throws may be employed.

For convenience, the fixed contacts of switch 46 are designated $a$, $b$, $c$, $d$, and $e$; while those of switch 47 are designated $a'$, $b'$, $c'$, $d'$, and $e'$. When the blades are thrown to contacts $a$ and $a'$, the source 43 is connected to the conductor of the cable and current flows from the source through the squib 29 to fire the same.

When the contacts $b$ and $b'$ are in engagement with the blades of switch 46 and 47, the system is in the "off" position, these contacts not being connected with anything.

When the blades engage contacts $c$ and $c'$, the system is in the caliper position. A supply circuit is then connected which includes the battery 44, a fixed resistance 48, a variable resistance 49 and a milliammeter 50, all connected in series between the cable sheath or the ground 45 and the conductor of the cable through the switches 46 and 47.

In parallel with this supply circuit there is a filter arrangement consisting of a choke coil 51, fixed resistances 52 and 53, an sduitable condensers 55 and 56 connected as shown. The main purpose of the filter is to subdue any spurious alternating potentials which may be generated from magnetism in the cable reel during the caliper logging. This filter also serves as a block to keep current from the 500 cycle source from reaching the vacuum tube voltmeter circuit during the firing operation.

A vacuum tube voltmeter 55 is connected across a variable resistor 54 in series with resistors 52 and 53 of the filter. Other types of voltage indicators, such as a potentiometer may, of course, be used.

With the switches 46 and 47 engaging contacts $c$ and $c'$, the battery 44 supplies direct current to the caliper tool in the well. This current is regulated and metered by the two resistors 48 and 49 and the milliammeter 50. The main part of this current flows through the conductor of the cable, through the resistors 22 and thence to the ground through the tip. The values of the ballast resistance 48 and the part of the resistance 49 in circuit are large in comparison to the sum of the resistance of the four rheostats 22. Therefore, the direct current flowing in the cable is practically constant for any setting of the caliper arms. If the resistors 22 are 1,000 ohms each, the battery 44 may have 45 volts, the resistor 48 have 40,000 ohms and the resistor 49 variable up to 10,000 ohms. With such an arrangement, a measure of the direct potential difference across the terminals of the cable is essentially a measure of the resistance of the sum of the resistors 22 for any given position of the caliper arms. The filter may have such resistance therein as to reduce the magnitude of this direct potential difference before it is fed on to the grid of the vacuum tube voltmeter 55.

The vacuum tube voltmeter is of the recording type, well known to those skilled in the art and only the coil 56 of the galvanometer is indicated in the drawing, it being understood that the deflection of the galvanometer may be recorded photographically or otherwise. The variable resistance 54 acts as a sensitivity control, making it possible, within reason, to impress any given constant number of millivolts upon the vacuum tube voltmeter for each inch of variation in the diameter of the well bore.

In addition to the equipment described above, the circuit includes two calibrating variable rheostats 57 and 58. One side of each of these rheostats is connected to the ground. The other sides are connected to contacts $d'$ and $e'$ or switch 47. Contacts $d$ and $e$ of switch 46 are connected to contact $c$, as shown.

Rheostat 57 may be variable up to 10,000 ohms, while rheostat 58 is variable up to 5,000 ohms. Thus, rheostat 57 may calibrate the maximum and rheostat 58, the minimum, of variations in resistance apt to occur at rheostats 22. These resistors may be set ahead of time to correspond to the resistance in the caliper tool when the arms are fully extended and nearly closed. Thus, it is only necessary to change the switch 46—47 from the caliper position (contacts $c$ and $c'$) to the calibrating positions ($d$ and $d'$ or $e$ and $e'$) in order to make a calibration of the vacuum tube voltmeter and associated equipment.

It will be obvious from the above description that in making a caliper log, the caliper assembly is lowered into the well on the cable. While lowering the device, the switches 46 and 47 may be maintained in the position $c$—$c'$, so that when the device strikes bottom or a bridge in the well, an indication will be obtained, due to the opening of the tip switch 33—34.

When the desired depth has been reached, the switches 46—47 are thrown to the position $a$—$a'$, so that the squib is fired and the caliper arms released. The switches 46—47 are then thrown to position $c$—$c'$ and the caliper tool is then pulled upwardly through the well bore, so that variations which occur in the total resistance across the rheostats 22 will be reflected on the record drawn by the galvanometer 56.

While only one embodiment of the invention has been shown and described herein, it is obvious that various changes may be made in the arrangement and construction of parts, without departing from the spirit of the invention or the scope of the annexed claims.

I claim:

1. A system for making a caliper log of an oil well including, in combination, a caliper tool adapted to be lowered into the well, said tool having arms adapted to contact the wall of the well bore, electrically releasable means for latching said arms in inoperative position on said tool, variable electrical means in said tool operable in response to movement of said arms, and means for grounding one side of said variable means in the well, a single conductor cable for lowering said caliper tool into the well and for making electrical connection to said variable electrical means and to said electrically releasable means, means at the surface of the ground for sending an electric current through the conductor of said cable to operate said electrically releasable means to release said arms, and means at the surface of the ground responsive to variations in said variable electrical means in said tool to indicate, at the surface, variations in movement of said arms to determine thereby variations in the diameter of the well bore.

2. A system for making a caliper log of an oil well including, in combination, a caliper tool adapted to be lowered into the well, said tool having arms adapted to contact the wall of the well bore, means for holding said arms in inoperative position on said tool, explosive means for releasing said holding means, electrical means for firing said explosive means, variable resistance means in said tool operable in response to movement of said arms, a tip for grounding one side of said variable resistance means, a single conductor cable for lowering said caliper tool into the well and for making electrical connection to said variable resistance means and to said electrical firing means, means at the surface of the ground for sending an alternating current through the conductor of said cable to operate said electrical firing means to release said arms, and means at the surface employing direct current for indicating variations in said variable resistance means to indicate, at the surface, variations in movement of said arms to determine thereby variations in the diameter of the well bore.

3. A caliper tool adapted for use with an electrical system, in making a caliper log of an oil well, including, in combination, a housing, variable resistance means in said housing, caliper arms pivoted to said housing, means for actuating said variable resistance means in response to movement of said arms, electrically releasable latching means mounted beneath said housing for holding said arms in inoperative position as the tool is lowered into the well, and a tip switch mounted beneath said latching means operable normally to ground one side of said variable resistance means and break connection to the ground upon the tool striking a bridge in the well or bottom of the well.

FINLEY T. ROBIDOUX.